US005162865A

United States Patent [19]

Kipphan et al.

[11] Patent Number: 5,162,865

[45] Date of Patent: Nov. 10, 1992

[54] METHOD AND DEVICE FOR POSITIONING A SENSOR DEVICE

[75] Inventors: Helmut Kipphan, Schwetzingen; Gerhard Löffler, Walldorf, both of Fed. Rep. of Germany

[73] Assignee: Heidelberger Druckmaschinen AG, Heidelberg, Fed. Rep. of Germany

[21] Appl. No.: 692,133

[22] Filed: Apr. 26, 1991

[30] Foreign Application Priority Data

Apr. 26, 1990 [DE] Fed. Rep. of Germany ....... 4013260
Feb. 27, 1991 [DE] Fed. Rep. of Germany ....... 4106082

[51] Int. Cl.[5] ............................................ G01B 11/00
[52] U.S. Cl. .................................... 356/138; 356/446
[58] Field of Search ............... 356/445, 446, 138, 153, 356/399; 101/DIG. 45

[56] References Cited

U.S. PATENT DOCUMENTS 4,565,450 1/1986 Wirz et al. ......................... 356/446
4,677,298 6/1987 Zelmanovia et al. ............... 356/446
4,737,035 4/1988 Aoki et al. .......................... 356/446
4,976,545 12/1990 Kipphan et al. .................... 356/446
5,050,994 9/1991 Kipphan et al. .................... 356/446

FOREIGN PATENT DOCUMENTS 3732934 4/1989 Fed. Rep. of Germany .

*Primary Examiner*—F. L. Evans
*Attorney, Agent, or Firm*—Herbert L. Lerner; Laurence A. Greenberg

[57] ABSTRACT

A method of positioning a measuring field of a sensor device on a selected region of an outer cylindrical surface of a cylinder in a rotary printing press, includes directing a light spot of a pilot light source into the selected region; storing the position of the light spot on the outer cylindrical surface of the cylinder in a computing/control device; and controlling the sensor device so that it supplies measured data from the selected region, and a device for performing the method.

14 Claims, 6 Drawing Sheets

METHOD AND DEVICE FOR POSITIONING A SENSOR DEVICE

The invention relates to a method of positioning a sensor device and, more particularly, a measuring field of a sensor device on a selected region of an outer cylindrical surface of a cylinder in a rotary printing press as well as to a device for performing the method.

The method and device are explained hereinafter with reference to an exemplary embodiment of a moisture-measuring device but, basically, they are also advantageous for other measuring tasks, such as for register measurement or color or inking measurement.

In offset printing, the quality of the printed products is critically influenced by the quantitative ratio between ink and dampening solution. Because this ratio is not constant, but changes in the course of a printing run, for example, as a function of temperature and humidity, it is indispensable to monitor and, if necessary, re-adjust the inking and the dampening-solution feed continuously.

Conventionally, a separate measuring strip, formed of full-tone and half-tone fields, is printed in the same form in order to monitor the inking. This so-called ink-control strip is measured by means of a densitometer or spectral photometer. Stable or steady inking is made possible by a comparison of, for example, zone-by-zone measured data, with prescribed setpoint values and, if necessary or desirable, by re-adjustment of the inking-zone adjustment elements.

German Published Non-Prosecuted Application (DE-OS) 37 32 934 describes a sensor device for determining the quantity of dampening solution on an offset printing plate. This heretofore known sensor device is made up of a light source, an optical system, a receiving device and an evaluating device. Rays from the light source are concentrated and directed onto an ink-free region of a printing plate, which is clamped onto a plate cylinder of the printing press. The reflected rays are measured within a given angular range by means of a row of diodes.

The measured data is evaluated via the third moment of the distribution, the so-called obliquity or skew factor. This variable reacts so sensitively to changes in the dampening-solution film thickness on the printing plate that feedback control within the relevant μm range is made possible. The positioning of the measuring field of the sensor device on an ink-free region of the printing plate ensures that changes in the measured data can be attributed exclusively to changes in the dampening-solution film thickness, assuming knowledge of the distribution of the reflected light on the dry surface of the plate.

The selection of a suitable measuring location on the clamped-on printing plate is performed visually. In the positioning of the sensor device, problems occur which stem, for example, in the aforedescribed case, from the fact that the sensor device is disposed very close to the plate cylinder and, consequently, the measuring location cannot be inspected from the outside. Depending upon the application, however, precise positioning is also prevented by the fact that the appertaining sensor device is too far away from the measuring location or that measuring light is used which has a wavelength in the non-visible spectral range, e.g. in the IR or UV range.

It is accordingly an object of the invention to provide a method and a device for performing the method which permit precise positioning of the measuring field of the sensor device on the selected region and ensure that measuring is performed in the selected region even while the printing press is in operation.

It is a further object of the invention to provide such a device which is of low-cost construction and is relatively simple to produce.

With the foregoing and other objects in view, there is provided, in accordance with one aspect of the invention, a method of positioning a measuring field of a sensor device on a selected region of an outer cylindrical surface of a cylinder in a rotary printing press, which comprises directing a light spot of a pilot light source into the selected region; storing the position of the light spot on the outer cylindrical surface of the cylinder in a computing/control device; and controlling the sensor device so that it supplies measured data from the selected region.

In accordance with another aspect of the invention, there is provided a device for performing a method of positioning a measuring field of a sensor device on a selected region of an outer cylindrical surface of a cylinder in a rotary printing press, comprising a pilot light source and the sensor device disposed on a cross-member so as to be movable axially with respect to the outer cylindrical surface of the cylinder, an operator-control station disposed in the vicinity of a printing unit of the press for enabling a motor-driven rotation of the cylinder, an angular transducer attached to a cylinder of the printing press, a computing/control device having means for storing the position of the selected region as a function of the axial position of a measuring device and as a function of the angular position of the cylinder to which the angular transducer is attached and means for controlling the sensor device so that the measured data originate from the selected region.

In accordance with another measure of the invention, the method includes defining the position of the measuring field of the sensor device with respect to the position of the light spot; and compensating for a misalignment between the position of the light spot and the position of the measuring field in a computer-controlled manner.

In accordance with a further measure of the invention, the method includes visually selecting a region suitable for the measuring task.

In accordance with an additional measure of the invention, the method includes axially displacing the pilot light source and/or rotating the cylinder so as to align the light spot with the selected region.

In accordance with an added measure of the invention, the method includes, storing the position of the pilot light source and/or the position of the light spot on the outer cylindrical surface of the cylinder as a function of the axial position and of the angular position.

In order to position the light spot of the pilot light source, the measuring device is moved mechanically or electro-mechanically on a cross-member. Then, the cylinder is rotated until the light spot is directed at the selected region of the outer cylindrical surface of the cylinder.

In accordance with yet another measure of the invention, the method includes feeding the positions of a plurality of the regions suitable for the measuring task which are located on the outer cylindrical surface of the cylinder to the computing/control device.

In accordance with yet a further measure of the invention, the method includes performing measurements in the selected regions while the printing press is in operation, and forming a representative measured value from the measurement results.

Advantageously, the cylinder is rotated in an inching mode by means of an operator-control station, which is disposed in the vicinity of the printing unit. The position of the region suitable for the measuring task is stored in a computing/control device as a function of the axial position and of the angular position of the cylinder. The angle-related information is supplied by an angular transducer, which is disposed preferably on a single-revolution shaft. Information regarding the axial position is supplied by a position detector, for example an incremental displacement sensor.

In accordance with another feature of the invention, the pilot light source and the sensor device are formed as an integrated unit.

In accordance with a further feature of the invention, the light spot from the pilot light source and the measuring field have centers lying on a circumferential circle of the outer cylindrical surface of the cylinder. This arrangement dispenses with the need for axial position detection, storage of the axial position value as well as automatic control because, once selected, the axial positions of the pilot light source and the sensor arrangement are maintained even if measured data is recorded while the printing press is in operation. In order to ensure a correct transfer of measured data from the selected region, it is sufficient, depending upon the relative positions of the prior light source and the sensor device, to subtract the angular difference between the light spot and the measuring field from the known angular position of the light spot or, as the case may be, to add the angular difference between the light spot and the measuring field to the known angular position of the light spot.

In accordance with an added feature of the invention, the computing/control device has means for triggering a transfer of measured data so that the measured data originate from the selected region, taking into account path misalignment and/or angular misalignment between the light spot and the measuring field.

In accordance with an additional feature of the invention, there are provided a means for matching shape and size of a light spot from the pilot light source, through the intermediary of an optical system, to the measuring field and to a dynamic response of the printing press and the computing/control device.

In accordance with still another feature of the invention, the cylinder is a plate cylinder having a printing plate clamped thereon.

In accordance with a concomitant feature of the invention, the sensor device has means for detecting an amount of dampening solution on an ink-free region of the printing plate.

Also in accordance with the invention, the method includes, at the start of the printing process, determining the positions of more than one region distributed over the outer cylindrical surface of a cylinder, successively selecting the regions during the printing process and using them for measuring purposes. In the case of the previously described measurement of the dampening solution, this opens up the possibility of taking into account different quantitative ratios between ink and dampening solution in different regions of a printing plate and for using these ratios in order to form a representative value, for example a mean value.

Furthermore, in accordance with the invention, the method includes matching the shape of the light spot of the pilot light source by means of a suitable optical system to the shape of the measuring field and expanding the shape of the light spot so that, even with the printing press running at maximum speed, assurance is provided that the measured data is obtained from within the selected region.

Other features which are considered as characteristic for the invention are set forth in the appended claims.

Although the invention is illustrated and described herein as embodied in a method and device for positioning a sensor device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 1*a* and 1*b* together are a diagrammatic and schematic longitudinal sectional view of a rotary printing press incorporating the device according to the invention;

Figure 1A:
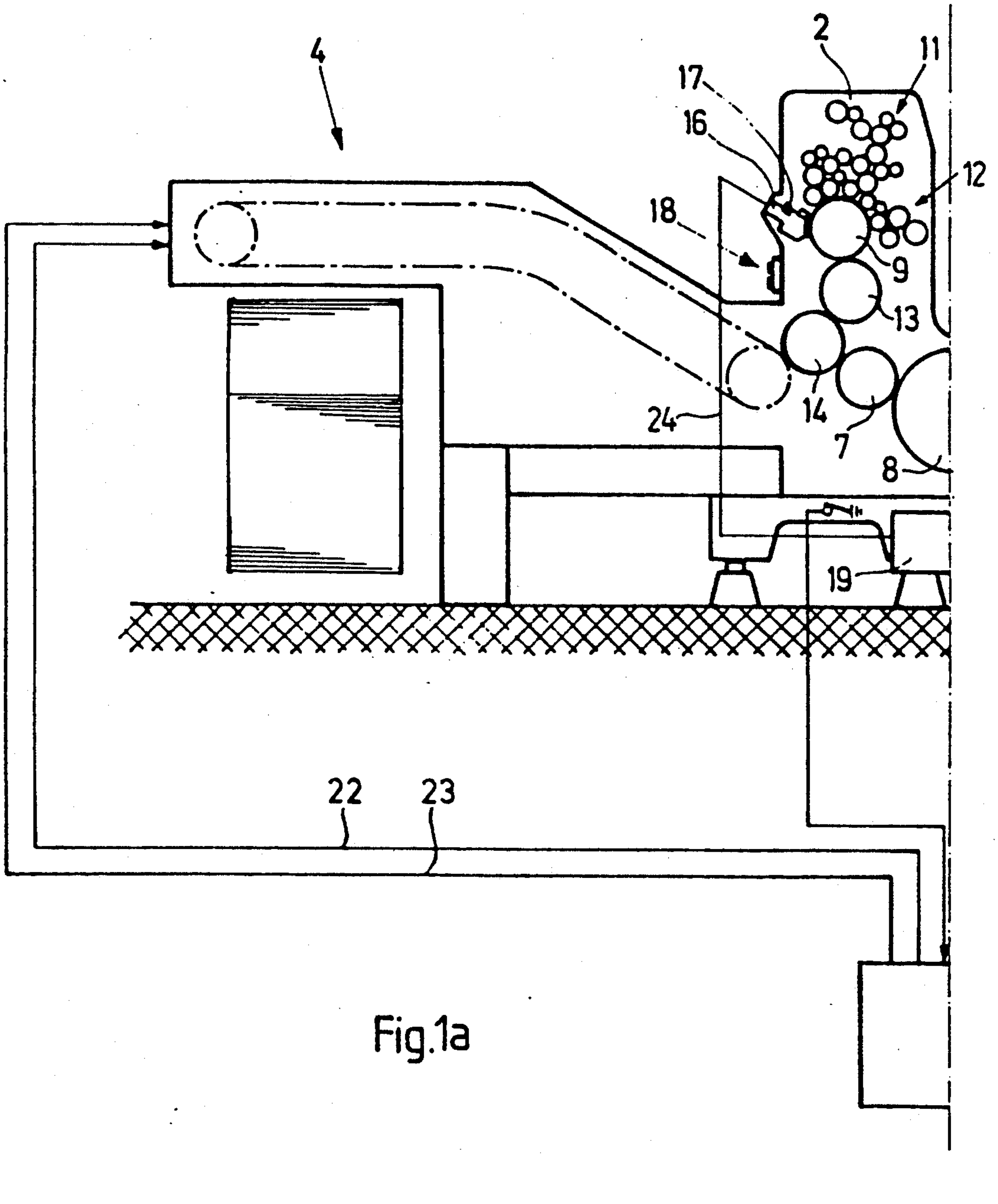
Figure 1B:
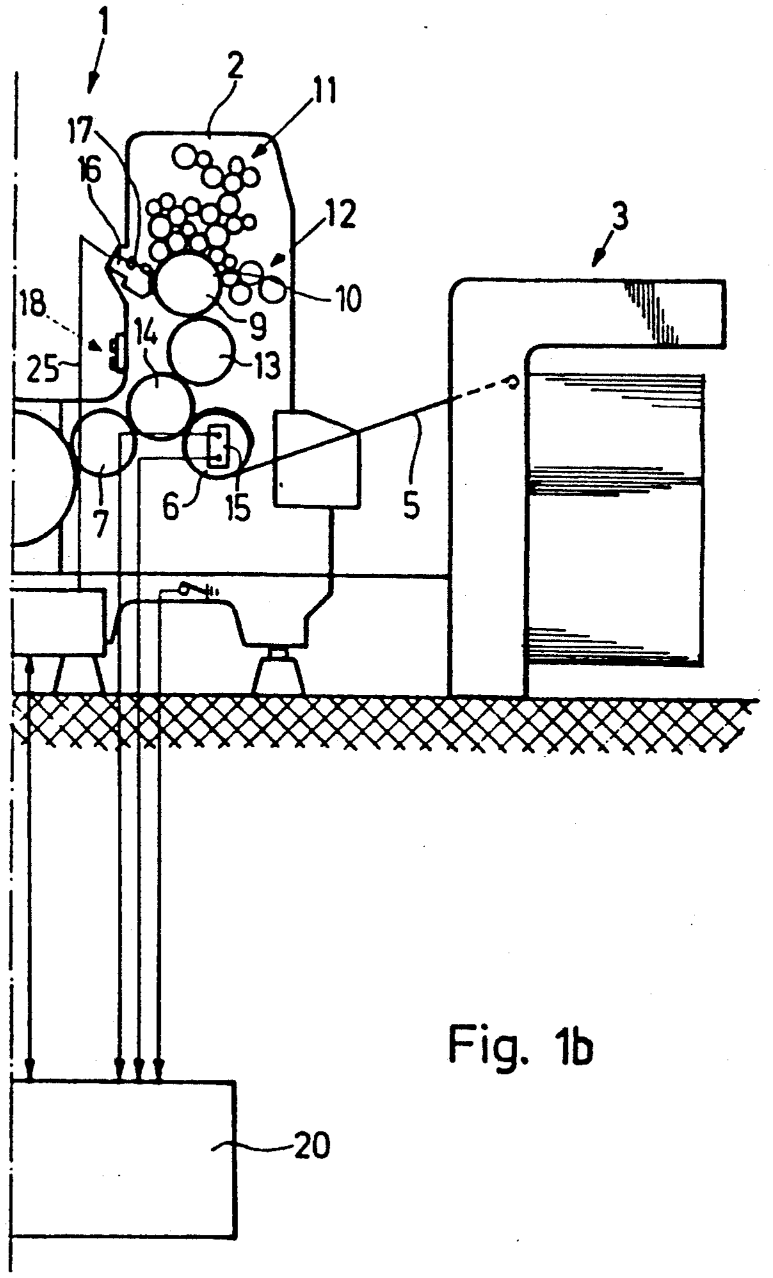

Referring now to the drawing and, first, particularly to the diagrammatic and schematic view of FIGS. 1*a* and 1*b*, there is shown therein in a longitudinal sectional view, a sheet-fed printing press 1 with two printing units 2, a feeder section 3 and a delivery section 4. The sheets, which are supplied via a feed table 5, are gripped by a gripper system of a register feed drum 6 and are transported through the printing press 1 via impression cylinders 14, transfer cylinders 7 and a turning drum 8. A printing plate 10, which is clamped onto respective plate cylinder 9, is inked and dampened by an inking unit 11 and a dampening unit 12, respectively. The print image or subject is transferred from the printing plate 10 onto a rubber-covered blanket cylinder 13 and is then printed onto the sheet which passes between the rubber-covered cylinder 13 and the impression cylinder 14.

Because the sheet can be taken over or accepted exactly from the feed table 5 and transported in-register through the printing press 1 only if transfer is effected within a predetermined range of angular rotation, a rotary encoder or angular transducer 15, such as an incremental transducer, is attached to the register feed drum 6. Additional significance accrues to the angular transducer 15 in conjunction with the invention of the instant application.

A dampness or moisture-measuring device 16 is assigned to each of the plate cylinders 9. Through the intermediary of a traverse or cross-member 17, the moisture-measuring device 16 can be moved by mechanical or electro-mechanical means axially with respect to the outer cylindrical surface of the plate cylinder 9 and thus with respect to the clamped-on printing plate 10. Through the intermediary of an operator-control station 18, respectively, disposed in the vicinity of the printing unit 2, the plate cylinder 9 is rotated in an inching mode until the moisture-measuring device 16 is aligned with a visually selected ink-free region of the printing plate 10. The fact that the selected region suitable for the measuring task has been reached is inputted at the operator-control stations 18 of the printing units 2 by appropriately pressing the buttons thereat. A suitable measuring region can be selected jointly for all printing units at one of the printing plates 10 or separately at each printing plate 10 of the printing unit 2, because it is quite possible for ink-free regions to lie at different locations in the individual printing inks. Through the intermediary of a computing/control device 19, the position-detection signals (as well as the measuring signals, later) are relayed to the printing-press control console 20, where they are assigned to the corresponding angular positions of the printing press 1 (press positions) which are supplied by the angular transducer 15. From a known misalignment between a light spot 31 (FIG. 2) of a pilot light source 21 and a measuring field 32 of the moisture-measuring device 16, the computing-/control device 19 computes the angle difference and-/or the time difference between the attainment of the inputted angular position and the instant of time offset thereto, at which the measured data is transferred, i.e. when the measuring field 32 is within the selected region. Furthermore, the computing/control device 19 evaluates the measured data obtained at the correct instant of time (i.e. in the ink-free region), for example via the third power of the distribution. If this yields deviations from given or prescribed setpoint values, appropriate moisture-actuating signals are sent to the dampening units 12 of the individual printing units 2 via data lines 22, 23, 24, 25.

Of course, the method according to the invention works also if the pilot light source 21 and the moisture-measuring device 16 are disposed independently of one another on at least one cross-member in front of the printing plate 10. For this purpose, the position data from the pilot light source 21 with respect to the surface of the printing plate 10 is fed to the computing/control system 19. Thereafter, the moisture-measuring device 16 is displaced on the cross-member 17 in accordance with the axial position input. The recording of measured data by the moisture-measuring device 16 is effected respectively with the angular setting of the printing-plate cylinder which was previously assigned to the selected image-free region of the printing plate 10 through the light spot 31 of the pilot light source 21.

Figure 2:
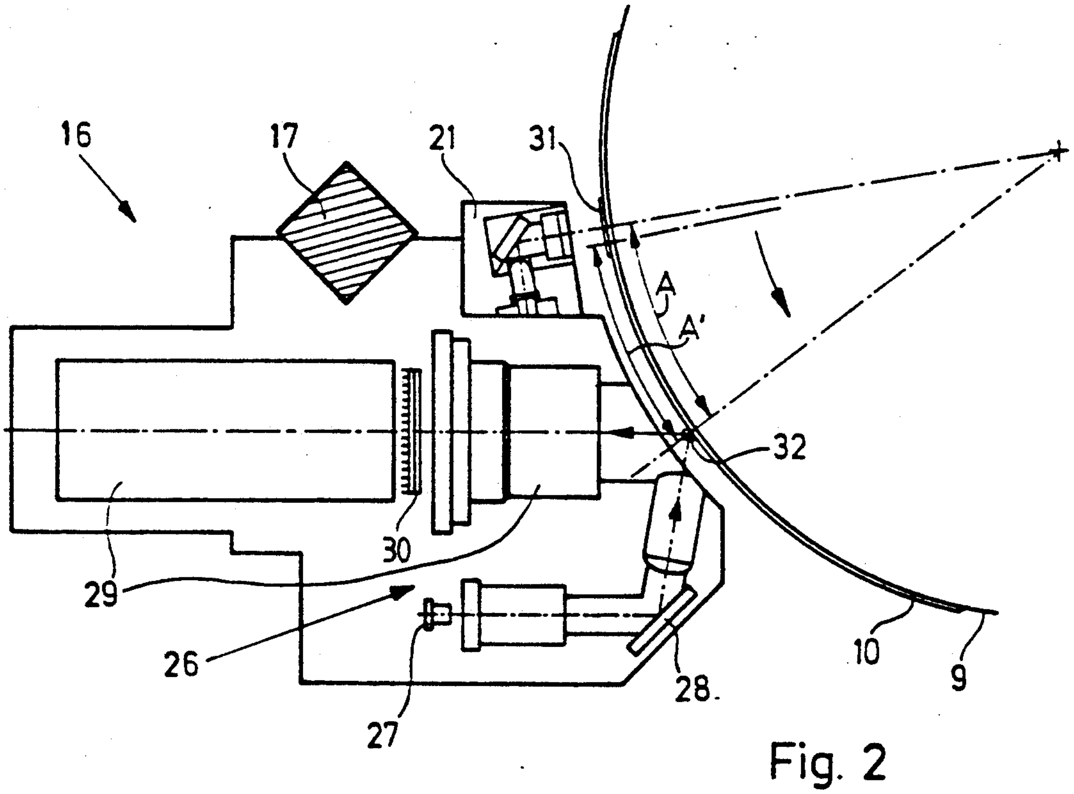
FIG. 2 is an enlarged fragmentary diagrammatic and schematic view of FIG. 1*a* showing, in greater detail, the device according to the invention which is assigned to a cylinder of the printing press.

FIG. 2 is a diagrammatic sectional view of the moisture-measuring device 16 according to the invention, which can be moved axially with respect to the plate cylinder 9 through the intermediary of the cross-member 17. The moisture-measuring device 16 is made up of a sensor device 26 and of an integrated pilot light source 21. The sensor device 26 is itself composed of a light source 27, an optical system 28 and a receiving device (optical system and electronics) 29. Through the intermediary of the optical system 28, the light rays from the light source 27 are concentrated and directed into a region of the printing plate 10, and are reflected therefrom at different angles. The reflected rays are detected across a given angular range by means of a row of diodes 30, it being necessary to take notice, when selecting the angular range that, in addition to the diffusely scattered rays, the specularly reflected rays strike the row of diodes 30.

Due to the superimposed arrangement of the pilot light source 21 and the sensor device 26, the center of the light spot 31 and the measuring field 32 lie on a circumferential circle of the outer cylindrical surface of the cylinder 9 at a spaced distance A from one another. With precise axial alignment of the moisture-measuring device 16, therefore, it is sufficient, in light of the knowledge of the misalignment between the light spot 31 and the measuring field 32, to have the angle-related information from the angular transducer 15 in order to trigger the transfer of measured data at the correct time and/or at the correct press position or setting.

FIG. 2 also clearly demonstrates the problems involved in the positioning of the sensor device 26 on the ink-free region of the clamped-on printing plate 10. On the one hand, the rays from the light source 27 of the sensor device 26 should, if possible, have no influence on the amount of dampening solution at the measuring location; on the other hand, within a limited angular range, the share of specularly and diffusely reflected rays should provide reliable information with regard to the thickness of the film of dampening solution on the printing plate 10. It is advantageous, therefore, to bring the sensor device 26 as close as possible to the printing plate 10. Of necessity, this restricts the view of the printing plate 10, so that it is no longer possible to position the measuring field 32 of the sensor device 26 precisely at the selected region.

Figure 3:
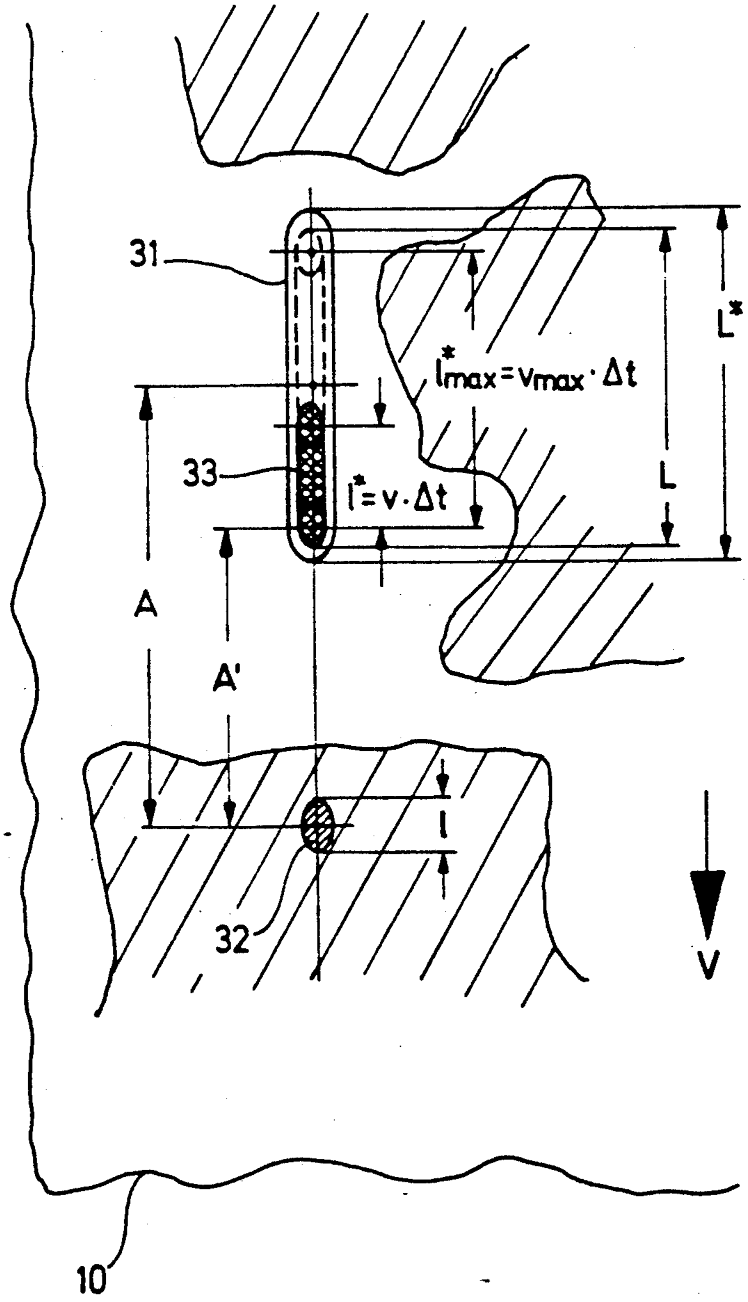
FIG. 3 is an enlarged fragmentary top plan view of a printing plate clamped to the cylinder in FIG. 2.

Shown in FIG. 3 is a top plan view of a detail of the printing plate of FIG. 2. The light spot 31 of the pilot light source 21 has been visually aligned with a selected ink-free region of the printing plate 10. The type of light has been selected in an advantageous manner so that good contrast with the surface of the printing plate is afforded. Due to the different arrangement of the pilot light source 21 and the sensor device 26, the centers of the light spot 31 and the measuring field 32 are offset with respect to one another by the circular-arc segment A.

A measurement is triggered after an angle-of-rotation corresponding to the circular-arc segment A'. In dimensioning the light spot 31, one must bear in mind that, because of the inertia of the electronics, a fixed time $\Delta t$ elapses between the release or triggering of the trigger signal and the end of measured-data transfer. Depending upon the respective printing speed v, the length of the effective measuring range 33 is $1^* = v \cdot \Delta t$. Taking into account the extent 1 of the measuring field 32 and the maximum printing speed Vmax, the minimum length of the light spot 31 results as $L = V_{max} \cdot \Delta t + 1$. If a safety margin is added to the minimum length L, the value $L^*$ results as the required minimum length for the light spot 31 and thus for the ink-free region on the printing plate 10.

Figure 4:
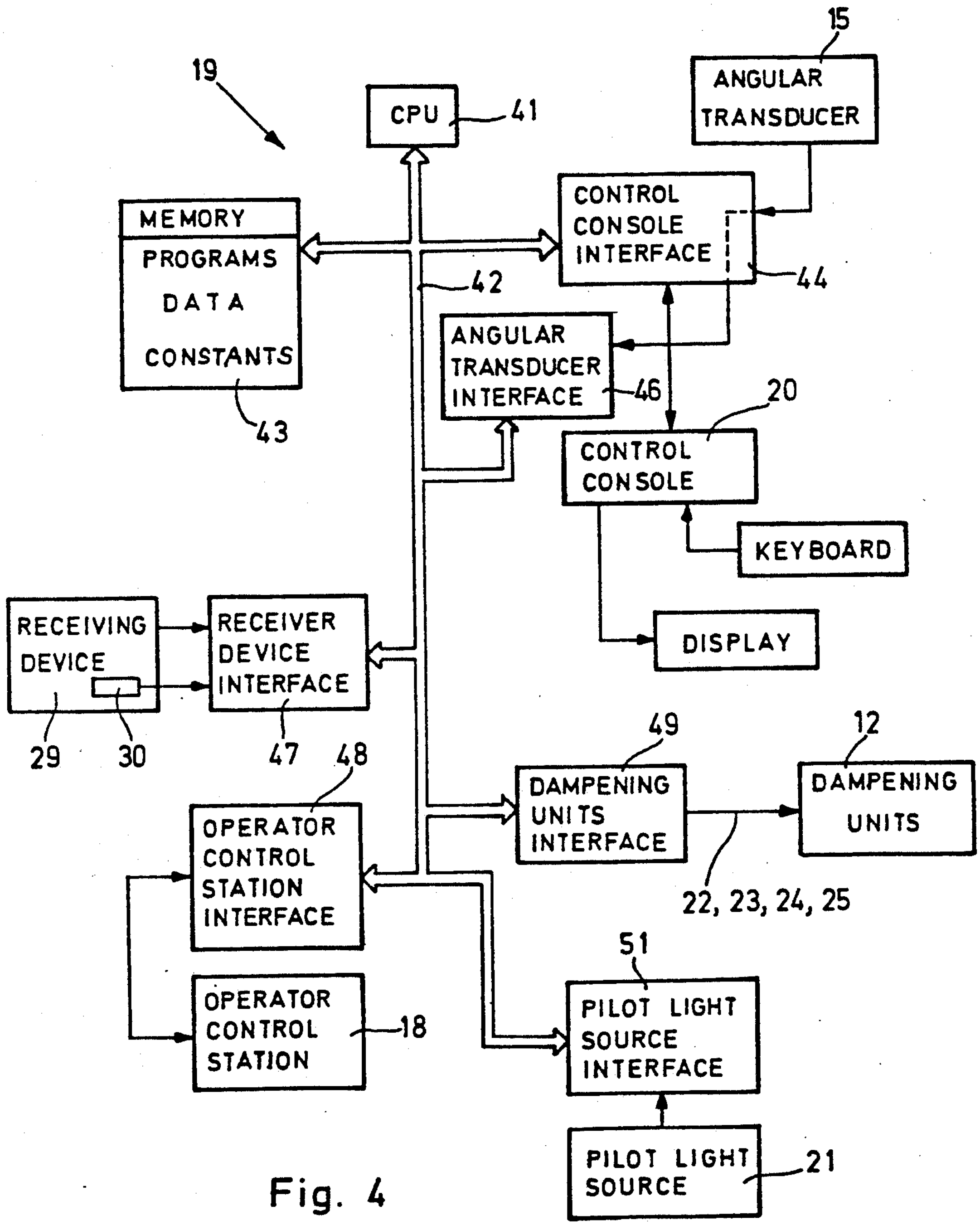
FIG. 4 is a block diagram of the device according to the invention.

FIG. 4 is a block diagram of the computing device 19, the control console 20 and the receiving device 29 of the moisture-measuring device 16, and the various control elements connected therewith.

The computing device 19 includes a central processing unit CPU 41 which communicates with the remaining system via a digital bus 42, which is connected to a program and data memory 43, a control console interface 44 which is connected with the control console 20, and an angular transducer interface 46 connected with the angular transducer 15 via the control console interface 44. An operator control station interface 48 is connected with the operator control station 18 and with the CPU 41 via the bus 42, and the receiving device interface 47 is connected with the receiving device 29 and diodes 30, on the one hand, and with the bus 42, on the other hand. A dampening-unit interface 49 is connected via the bus 42 with the CPU 41, and via data lines 22, 23, 24 and 25 with the dampening units 12. A pilot light source interface 51 is connected with the pilot light source 21 and the bus 42.

Figure 5:
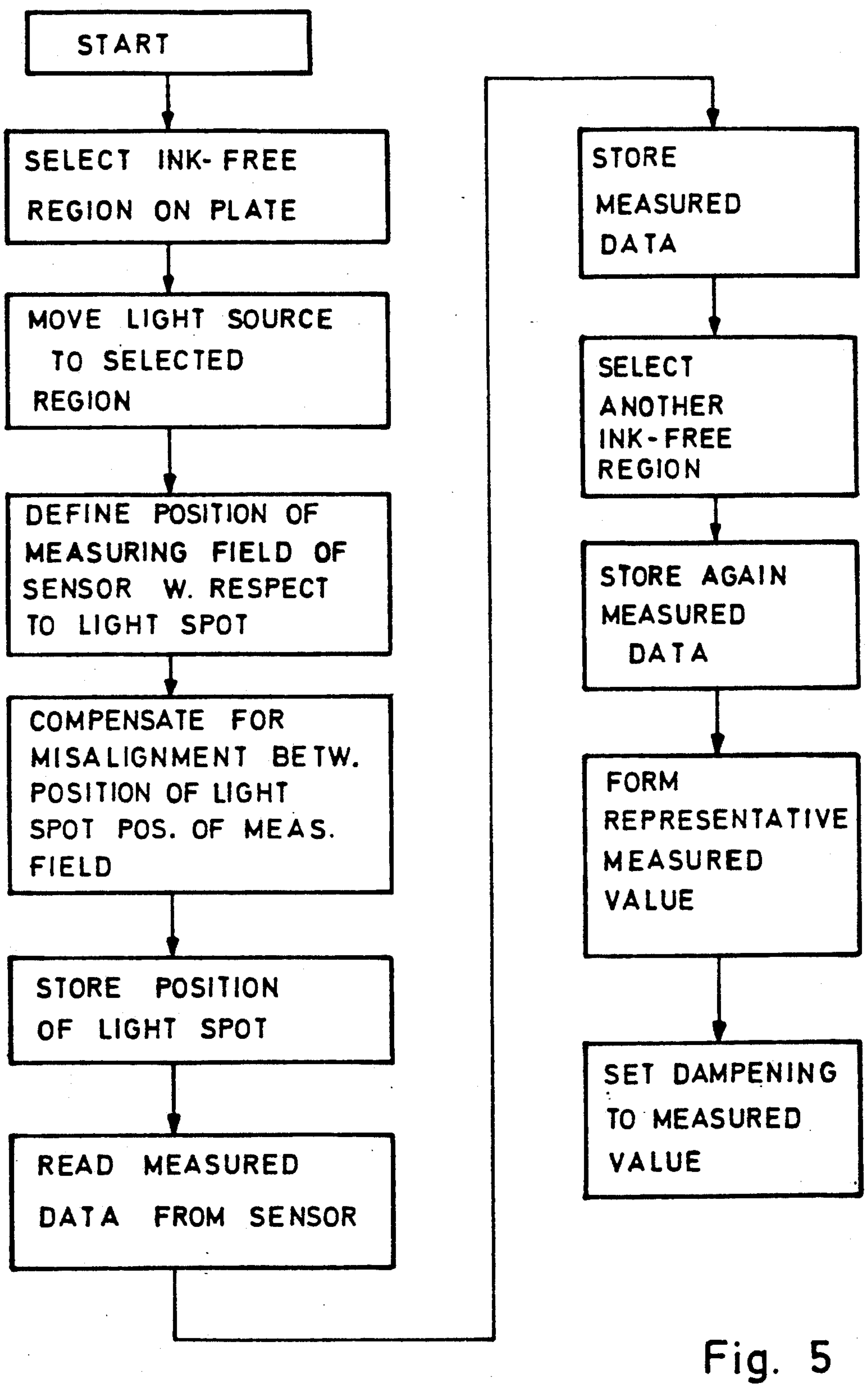
FIG. 5 is a flow chart showing the steps performed in practicing the method according to the invention.

FIG. 5 is a flow chart showing the various steps performed in the method according to the invention.

I claim:

1. Method of determining a position of a measuring field of a sensor device on a selected region of an outer cylindrical surface of a cylinder in a rotary printing press, which comprises directing a light spot of a pilot light source into the selected region; visually selecting a region within the light spot to be measured, storing the position of the visually selected region on the outer cylindrical surface of the cylinder in a computing/control device; and subsequently triggering the sensor device so that it supplies measured data from the selected region.

2. Method according to claim 1, which includes defining the position of the measuring field of the sensor device with respect to the position of the light spot; and compensating for a misalignment between the position of the light spot and the position of the measuring field in a computer-controlled manner.

3. Method according to claim 1, which includes visually searching the light spot for a region suitable for measuring data.

4. Method according to claim 3, which includes axially displacing the pilot light source and/or rotating the cylinder so as to align the selected region with the measuring field.

5. Method according to claim 1, which includes, storing the position of the selected region on the outer cylindrical surface of the cylinder as a function of an axial position and of an angular position.

6. Method according to claim 1, including feeding the positions of a plurality of regions suitable to be measured which are located on the outer cylindrical surface of the cylinder to the computing/control device.

7. Method according to claim 6, which includes performing measurements in the selected regions while the printing press is in operation, and forming a representative measured value from the measurement results.

8. Device for performing a method of determining a position of a measuring field of a sensor device on a visually selected region of an outer cylindrical surface of a cylinder in a rotary printing press, comprising a pilot light source for applying a light spot on the selected region, the sensor device for measuring data on the measuring field disposed on a cross-member so as to be movable axially with respect to the outer cylindrical surface of the cylinder, an operator-control station disposed in the vicinity of a printing unit of the press for enabling a motor-driven rotation of the cylinder, an angular transducer attached to a cylinder of the printing press, a computing/control device having means for storing the position of the selected region as a function of the axial position of a measuring device and as a function of the angular position of the cylinder to which the angular transducer is attached, and means for controlling the sensor device so that the measured data originate from the selected region.

9. Device according to claim 8, wherein said pilot light source and the sensor device are formed as an integrated unit.

10. Device according to claim 9, wherein a light spot from said pilot light source and the measuring field have centers lying on a circumferential circle of the outer cylindrical surface of the cylinder.

11. Device according to claim 10, wherein said computing/control device has means for triggering a transfer of measured data so that the measured data originate from the selected region, taking into account path misalignment and/or angular misalignment between said light spot and the measuring field.

12. Device according to claim 8, including means for matching shape and size of a light spot from the pilot light source, through the intermediary of an optical system, to the measuring field and to a dynamic response of the printing press and said computing/control device.

13. Device according to claim 8, wherein the cylinder is a plate cylinder having a printing plate clamped thereon.

14. Device according to claim 13, wherein the sensor device has means for detecting an amount of dampening solution on an ink-free region of the printing plate.

* * * * *